US009653079B2

(12) United States Patent
Gulati et al.

(10) Patent No.: US 9,653,079 B2
(45) Date of Patent: May 16, 2017

(54) CLOCK SWITCHING IN ALWAYS-ON COMPONENT

(71) Applicant: Apple Inc., Cupertino, CA (US)

(72) Inventors: Manu Gulati, Saratoga, CA (US); Gilbert H. Herbeck, Livermore, CA (US); Alexei E. Kosut, Campbell, CA (US); Girault W. Jones, Los Gatos, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/621,093

(22) Filed: Feb. 12, 2015

(65) Prior Publication Data

US 2016/0240193 A1    Aug. 18, 2016

(51) Int. Cl.
  *G10L 15/28* (2013.01)
  *G10L 19/00* (2013.01)
  (Continued)

(52) U.S. Cl.
  CPC .............. *G10L 15/28* (2013.01); *G10L 15/22* (2013.01); *G10L 2015/088* (2013.01); *G10L 2015/223* (2013.01)

(58) Field of Classification Search
  CPC .................................. G10L 15/28; G10L 15/22
  See application file for complete search history.

(56) References Cited

U.S. PATENT DOCUMENTS 5,615,296 A * 3/1997 Stanford ................. G10L 15/22
  704/222
5,774,841 A * 6/1998 Salazar .................... G10L 15/22
  704/225

(Continued)

FOREIGN PATENT DOCUMENTS

JP         05252121 A    9/1993
WO      2015005927 A1    1/2015

OTHER PUBLICATIONS

Office Action from U.S. Appl. No. 14/109,101, mailed Oct. 15, 2015, 18 pages.

(Continued)

*Primary Examiner* — Tammy Paige Goddard
*Assistant Examiner* — Edwin S Leland, III
(74) *Attorney, Agent, or Firm* — Meyertons, Hood, Kivlin, Kowert & Goetzel, P.C.; Lawrence J. Merkel

(57) ABSTRACT

In an embodiment, a system on a chip (SOC) may include one or more central processing units (CPUs), a memory controller, and a circuit configured to remain powered on when the rest of the SOC is powered down. The circuit may be configured to receive audio samples and match those audio samples against a predetermined pattern. The circuit may operate according to a first clock during the time that the rest of the SOC is powered down. In response to detecting the predetermined pattern in the samples, the circuit may cause the memory controller and processors to power up. During the power up process, a second clock having one or more better characteristics than the first clock may become available. The circuit may switch to the second clock while preserving the samples, or losing at most one sample, or no more than a threshold number of samples.

18 Claims, 5 Drawing Sheets

(51) Int. Cl.
*G10L 15/22* (2006.01)
*G10L 15/08* (2006.01)

(56) References Cited

U.S. PATENT DOCUMENTS

| | | | | |
|---|---|---|---|---|
| 5,983,186 | A * | 11/1999 | Miyazawa | G10L 15/26 704/233 |
| 6,408,396 | B1 * | 6/2002 | Forbes | G06F 3/165 713/323 |
| 7,774,204 | B2 * | 8/2010 | Mozer | G10L 13/00 315/307 |
| 8,117,475 | B2 | 2/2012 | Pesavento et al. | |
| 8,768,707 | B2 | 7/2014 | Mozer | |
| 2009/0292934 | A1 * | 11/2009 | Esliger | G06F 1/3203 713/323 |
| 2009/0300386 | A1 * | 12/2009 | Archer | G06F 1/3203 713/320 |
| 2010/0312971 | A1 * | 12/2010 | Moallem | G06F 1/3203 711/135 |
| 2011/0291801 | A1 * | 12/2011 | Sommer | G08B 15/004 340/8.1 |
| 2012/0102347 | A1 * | 4/2012 | Hobson | G06F 1/3287 713/323 |
| 2013/0080167 | A1 * | 3/2013 | Mozer | G10L 17/22 704/246 |
| 2013/0129114 | A1 * | 5/2013 | Lesso | H03L 7/08 381/98 |
| 2013/0223635 | A1 * | 8/2013 | Singer | H04R 1/1041 381/56 |
| 2013/0225238 | A1 * | 8/2013 | He | G06F 1/3234 455/558 |
| 2013/0325484 | A1 * | 12/2013 | Chakladar | G10L 15/26 704/275 |
| 2014/0077849 | A1 * | 3/2014 | Chen | H03L 7/08 327/156 |
| 2014/0122078 | A1 * | 5/2014 | Joshi | G06F 1/324 704/251 |
| 2014/0179298 | A1 * | 6/2014 | Grokop | G01S 19/48 455/418 |
| 2014/0218372 | A1 * | 8/2014 | Missig | G06F 3/044 345/473 |
| 2014/0222436 | A1 * | 8/2014 | Binder | G06F 3/167 704/275 |
| 2014/0257813 | A1 * | 9/2014 | Mortensen | G10L 15/02 704/251 |
| 2014/0281625 | A1 * | 9/2014 | Younger | G06F 1/3206 713/323 |
| 2014/0358552 | A1 * | 12/2014 | Xu | G06F 1/3234 704/275 |
| 2015/0066438 | A1 * | 3/2015 | Brooks | H03K 3/0231 702/191 |
| 2015/0205342 | A1 * | 7/2015 | Ooi | G06F 1/3206 713/323 |
| 2015/0244349 | A1 * | 8/2015 | Bendel | H03H 17/0642 341/61 |
| 2015/0245154 | A1 * | 8/2015 | Dadu | G06F 3/167 381/56 |
| 2015/0301557 | A1 * | 10/2015 | Walker | G06F 1/10 375/376 |
| 2015/0326231 | A1 * | 11/2015 | Thinakaran | H03L 7/0991 331/25 |

OTHER PUBLICATIONS

U.S. Appl. No. 14/109,101, filed Dec. 17, 2013, Timothy J. Millet.
"The Jigsaw Continuous Sensing Engine for Mobile Phone Applications", Hong Lu et al., Nov. 3-5, 2010, pp. 1-14.
"How to Get Started With Hands-Free Control on the Moto X", Nick Mediati, Sep. 9, 2013, pp. 1-4.
"Use Voice Commands from the Samsung Galaxy S3 Lock Screen", Nicole Cozma, Oct. 15, 2012, pp. 1-11.
"How the Samsung Galazy S III Can Listen Even While Sleeping", Mashable, May 29, 2012, pp. 1-14.
Non-Final Office Action, U.S. Appl. No. 14/109,101, mailed Jun. 4, 2015, 18 pages.
Office Action, U.S. Appl. No. 14/109,101; mailed May 31, 2016; 12 pages.
International Search Report and Written Opinion in application No. PCT/US2015/066310 issued Mar. 28, 2016, 13 pages.

* cited by examiner

CLOCK SWITCHING IN ALWAYS-ON COMPONENT

BACKGROUND

Technical Field

Embodiments disclosed herein are related to the field of mobile devices and, more particularly, to voice/audio control of mobile devices.

Description of the Related Art

Mobile devices have become ubiquitous. Mobile devices may include any electronic device that is designed to operate on portable power (e.g. a battery) and to be easily carried by a user. Mobile devices may include cell phones, "smart" phones, personal digital assistants (PDAs) such as the iTouch™, entertainment devices such as the iPod™ and MP3 players, laptop computers, net top computers, tablet devices such as the iPad™ and Windows® based tablets, etc. Most of these devices include wireless connectivity (e.g. WiFi, cell connection, etc.) and thus can be used as an information source in addition to providing various local applications that can be run on the device directly.

Mobile devices can be controlled through a user interface such as a touch screen, a keyboard that is part of the device or connected to the device, various pointing devices (e.g. mice, touchpads, etc.), etc. More recently, voice control has started to become more common. For example, some of Apple's i-devices (iPhone™, iPad™, etc.) have adopted voice control via the Siri™ application. The user can pick up the device, press and hold a button, and wait for Siri™ to respond. When Siri™ responds, the user can verbally ask a question or provide a command, which Siri™ will interpret and attempt to satisfy. The act of holding down the button until Siri™ responds serves to wake up the device (if it is in an idle state), initialize the operating system, and activate the Siri™ application so that it is ready to accept input.

Some mobile devices have begun to implement a limited voice command activation function when the device is idle. A device can be idle if it appears to the user to be "off" (even though the user knows the device is on because it may accept an electronic communication such as an email, a phone call, or a text message). The idle device generally does not have the display screen turned on, and many internal components can be powered down and need to be initialized for full function of the device. In mobile devices with the limited voice command activation function, the user may say a key word or phrase to cause the device to turn "on" and accept further voice control. For example, one such phrase is "hey Google now" used for Android smart phones.

With the limited command activation, the user must pause after uttering the key phrase and await a visual and/or audio indication that the device is ready for further input. While the device is idle, the device has a microphone turned on and is listening with a discrete digital signal processor (DSP) for the key word/phrase. Once the key word/phrase has been recognized, the DSP may signal the rest of the device to initialize (or boot) and then respond to the user when ready. The delay between uttering the key word/phrase and then the desired question/command makes the interface unwieldy. Therefore, the limited command activation is only a small improvement over picking up the device and pressing/holding the button as described above.

SUMMARY

In an embodiment, an integrated circuit (e.g. a system on a chip, or SOC) may include one or more central processing units (CPUs), a memory controller, and a circuit configured to remain powered on when the rest of the SOC is powered down. The circuit may be configured to receive audio samples corresponding to sound sensed by a microphone, and further configured to match those audio samples against a predetermined pattern to detect a possible command from a user of the device that includes the SOC. The predetermined pattern may represent the user's voice uttering a key word or phrase, for example. The circuit may operate according to a first clock during the time that the rest of the SOC is powered down. The first clock may be a low power clock, and may have various characteristics that are lower power and lower performance than other clocks (e.g. high phase noise, a duty cycle that is not very symmetrical, high jitter, etc.). In response to detecting the predetermined pattern in the samples, the circuit may cause the memory controller and processors to power up so that audio samples may be stored in the memory to which the memory controller is coupled and processed by the processors. During the power up process, a second clock having one or more better characteristics than the first clock may become available. The circuit may switch to the second clock while preserving the samples. In an embodiment, the circuit may lose or corrupt fewer than a threshold number of samples. The threshold number of samples may be few enough that the speech recognition implemented in the system is capable of accurately recognizing the phrase uttered by the user. For example, up to 4 or 5 samples may be lost/corrupted while still permitting correct recognition. In an embodiment, at most one sample may be lost, thus meeting the threshold. In another embodiment, no samples may be lost.

BRIEF DESCRIPTION OF THE DRAWINGS

The following detailed description makes reference to the accompanying drawings, which are now briefly described.

Figure 1:
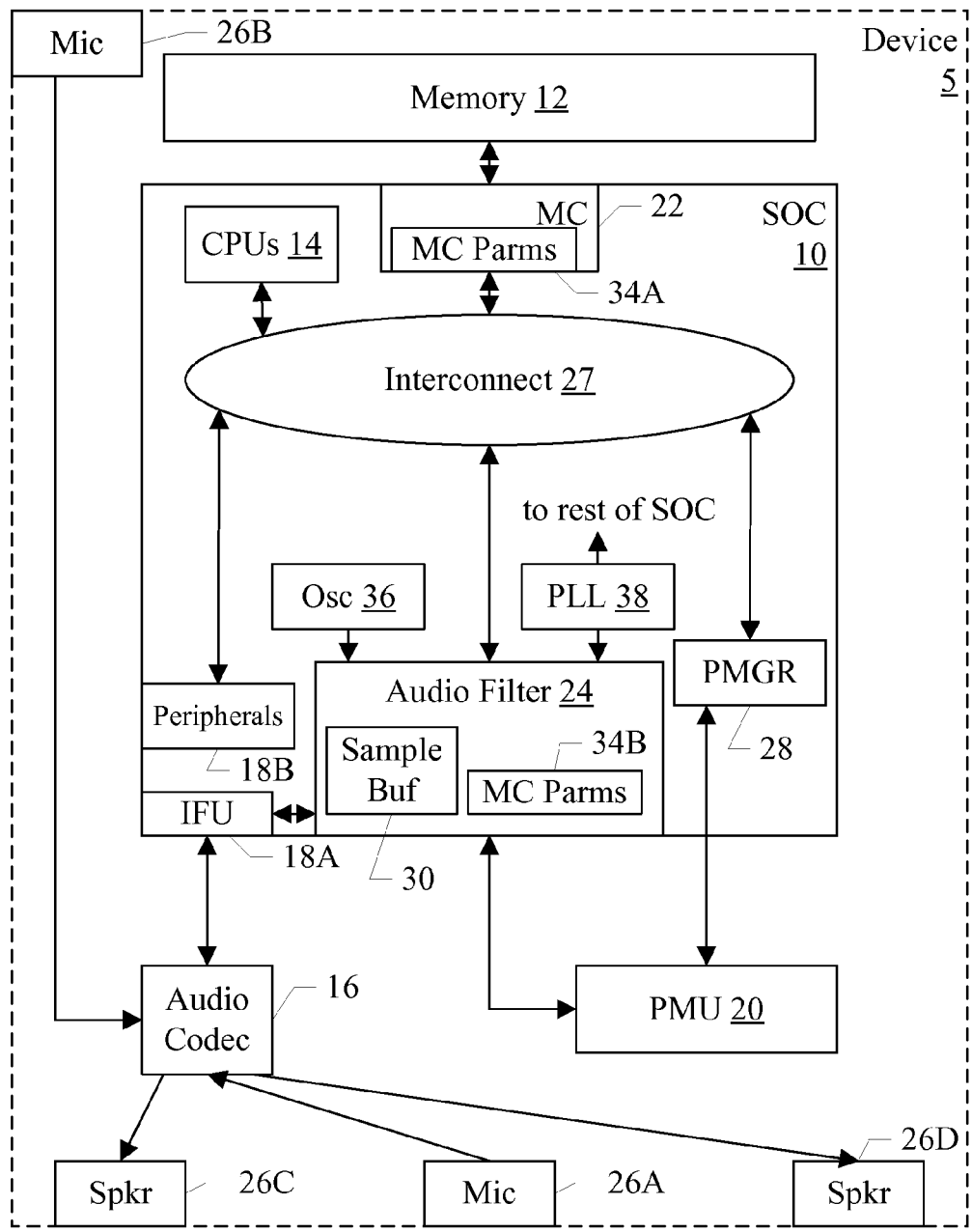
FIG. 1 is a block diagram of one embodiment of a device.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of a device 5 is shown. In the illustrated embodiment, the device 5 may include an integrated circuit (IC) 10, which may be an SOC in this example. The SOC 10 may be coupled to a memory 12, an external audio coder/decoder (codec) 16, and a power management unit (PMU) 20. The audio codec 16 may be coupled to one or more audio sensors, collectively referred to as sensors 26. For example, the audio codec 16 may be coupled to one or more microphones (mic) 26A-26B and one or more speakers (spkr) 26C-26D.

As implied by the name, the components of the SOC 10 may be integrated onto a single semiconductor substrate as an integrated circuit "chip." In some embodiments, the components may be implemented on two or more discrete chips in a system. Additionally, various components may be integrated on any integrated circuit (i.e. it need not be an SOC). However, the SOC 10 will be used as an example herein. In the illustrated embodiment, the components of the SOC 10 include a central processing unit (CPU) complex 14, peripheral components 18A-18B (more briefly, "peripherals"), a memory controller 22, an audio filter circuit 24, a power manager circuit (PMGR) 28, an on-chip oscillator 36, a phase-lock loop (PLL) 38, and a communication fabric 27. The components 14, 18A-18B, 22, 24, and 28 may all be coupled to the communication fabric 27. The memory controller 22 may be coupled to the memory 12 during use. Similarly, the peripheral 18A may be an interface unit (IFU) coupled to the audio codec 16 during use, which is further coupled to the audio sensors 26 during use. The IFU 18A is further coupled to the audio filter circuit 24. The oscillator 36 and the PLL 38 are coupled to the audio filter circuit 24, and the PLL 38 may be coupled to a remainder of the SOC 10 as well.

The device 5 may be any type of portable electronic device, such as a cell phone, a smart phone, a PDA, a laptop computer, a net top computer, a tablet device, an entertainment device, etc. In some embodiments, the device 5 may be a non-portable electronic device such as a desktop computer as well. Such non-portable devices may also benefit from the audio device control features described herein.

During times that the device 5 is idle, portions of the SOC 10 may be powered down. Particularly, the CPU complex 14, the memory controller 22, the peripheral 18B, the interconnect 27, the PLL 38, and a portion of the PMGR 28 may be powered down. If the device 5 is idle but not completely powered down, on the other hand, the audio filter circuit 24 may remain powered, as may the IFU 18A and the oscillator 36. Components external to the SOC 10 may be powered up or down as desired when the device 5 is idle. Particularly, the memory 12 may remain powered and thus capable of retaining the data stored therein. In an embodiment in which the memory 12 is a DRAM of one of various types, the memory 12 may be placed in self-refresh mode to retain the stored data during times that the device 5 is idle.

The PLL 38 and the oscillator 36 may each be a clock source in the illustrated embodiment, providing the clocks for the digital logic in the SOC 10. The PLL 38 may be a clock source during operation when portions of the SOC 10 besides the audio filter circuit 24, the IFU 18A, and the oscillator 36 are powered on. The PLL 38 may provide a high performance, high quality clock to the audio filter circuit 24. The PLL 38 may also provide high performance, high quality clocks to other parts of the SOC 10. One or more clocks may be provided, and in some cases clocks to different components in the SOC 10 may have different frequencies. The PLL 38 may thus be multiple PLLs, or various clock dividers/multipliers may be used to generate the clocks from a PLL, or any combination of PLLs and clock dividers/multipliers may be used. On the other hand, during idle times when portions of the SOC 10 are powered down, the oscillator 36 may provide a low power clock to the audio filter circuit 24. The oscillator 36 may be a relatively simple, low power circuit such as a ring oscillator. The oscillator 36 may be powered during the idle times and also at times that other components of the SOC 10 are powered up, or may be powered off when other components are powered up (since the PLL 38 may be providing the clock during such times).

Generally, a clock may be viewed as higher or lower quality or performance based on its closeness to an ideal clock. An ideal clock may be a square wave having a fixed frequency and 50% duty cycle. The fixed frequency may be selectable, but may be invariant with regard to noise, temperature, voltage variation, etc. In other words, the frequency may be certain and the rising and falling edges may be invariant from clock cycle to clock cycle. Real clocks differ from the ideal clock by varying degrees, and higher quality/performance clocks may differ from the ideal clock by lesser amounts than lower quality clocks.

Various characteristics of a clock may be indicative of its quality or performance. For example, the phase noise of the clock may be a characteristic. Phase noise may be the frequency domain representation of rapid, short-term, random fluctuations in the phase of a clock. If a clock with a large amount of phase noise is used to operate an analog to digital converter or digital to analog converter, the audio performance of that converter may be degraded. The clock from the PLL 38 may have lower phase noise than the clock from the oscillator 36. The accuracy of the long-term average of the clock's frequency, e.g. as compared to an international time standard, may be a characteristic of its quality/performance, as an inaccurate frequency may result in an unexpected shift of musical pitch. The clock from the PLL 38 may have better frequency accuracy than the clock from the oscillator 36. The period jitter of a clock may be a characteristic of its quality/performance, as high period jitter detracts from the useful portion of the clock cycle in the digital logic design of the SOC 10. Thus, low period jitter may be a high quality/performance clock characteristic. The clock from the PLL 38 may have lower period jitter than the clock from the oscillator 36. The duty cycle of a clock may be a characteristic of its quality/performance. A symmetrical duty cycle (50% high, 50% low) may be the preferred duty cycle for designs that may include circuitry tied to one or the other transition of the clock. Thus, duty cycles near 50% may be a high quality characteristic, as the high and low phases of the clock may be balanced at 50%. The duty cycle of the clock from the PLL 38 may be nearer 50% than the duty cycle of the clock from the oscillator 36.

During the idle time, the audio filter circuit 24 may be configured to receive audio samples from the audio codec 16, through the IFU 18A and may attempt to detect a predetermined pattern in the samples (e.g. the key word/phrase to wake up the device 5 in order to service a command or request uttered by the user). The predetermined pattern may be programmed into the audio filter circuit 24 or may be hard coded in the audio filter circuit 24. In an embodiment, the predetermined pattern may be captured from the user verbally uttering the key word/phrase, training the device 5 to the user's particular voice. In another embodiment, the predetermined pattern is a generic pattern that represents the key word/phrase as spoken with a variety of inflections, tones, etc. The detection of the key phrase may be performed with the low power clock from the oscillator 36.

In response to detecting the pattern, the audio filter 24 may be configured to cause the memory controller to be powered up and initialized (so that the matching samples and following samples may be stored in memory) and may also be configured to cause the CPU complex 14 to be powered up to boot the operating system (and potentially other portions of the SOC 10, depending on the implementation). In an embodiment, the memory controller 22 may power up relatively quickly. The PLL 38 may lock, and the memory controller 22 may be initialized, with a fairly predictable delay that is shorter than the booting up of the operating system. The interconnect 27 may be powered up as well so that the audio filter circuit 24 may transmit the parameters mentioned below and write memory operations to write the samples to the memory 12. The audio filter circuit 24 may include a sample buffer 30, and the audio filter circuit 24 may be configured to temporarily buffer samples in the sample buffer 30 for comparison to the predetermined pattern and, once the pattern is detected, to further buffer samples until the memory controller 22 is ready to receive writes to the memory 12. Thus, the size of the sample buffer 30 may be based on the delay from detecting the pattern until the memory controller 22 is ready. In some embodiments, the sample buffer 30 may be sized to permit buffering of the samples that match the predetermined pattern, the subsequently-received samples based on the delay until the memory controller is ready, and one or more samples prior to the samples that matched the predetermined pattern (i.e. the key word/phrase/sound). The prior samples may be processed to determine the background noise being captured by the microphone, which may aid the more accurate processing of the subsequent samples.

Once the PLL 38 is powered up and locked, the audio filter circuit 24 may switch from the low power clock from the oscillator 36 to the high performance, high quality clock from the PLL 38. The switch may be glitchless, and may occur over a few clock cycles (e.g. 3 or less) of the high quality clock. The time period for the switch may be much less than the sample time for the audio samples. Accordingly, at most one audio sample may be lost during the switch (and the probability of loss may be low). An audio sample may be lost if it is not included in the samples. An audio sample may also be corrupted (that is, included in the samples but not an accurate sample). At most a threshold number of samples may be corrupted during the switch. In an embodiment, at most one sample may be lost. Alternatively, the audio filter circuit 24 may be configured to ensure that the switch occurs at a time that is not near the arrival of a new sample, thus ensuring no sample loss. Operating at the high performance, high quality clock may permit additional processing of samples in the audio filter circuit 24 as well as high bandwidth transmission of samples to the memory 12, etc.

In some embodiments, the memory controller 22 may support advanced DRAM technologies which involve training the memory controller 22 and the memory 12 to properly sync on the links between them. The parameters of the memory controller 22 configuration may be programmed into the memory controller 22, either directly by hardware via the training or by software (reference numeral 34A). To more rapidly restore the memory controller 22 to operation from the audio filter circuit 24, the audio filter circuit 24 may shadow the parameters (reference numeral 34B). Alternatively, the parameters 34B may be a conservative set of parameters that are known to work properly across all versions of the DRAMs and all operating conditions in the device 10. The audio filter circuit 24 may transfer the parameters 34B to the memory controller 22 to ensure that the memory controller is prepare to write the memory 12.

The CPUs may begin execution of the operating system, and may determine that the reason the SOC 10 is reactivating is that the audio filter 24 detected the key word/phrase. The CPUs may read the samples from the memory 12, and may verify that the key word/phrase is indeed detected. For example, in some embodiments, the audio filter 24 may use a simpler and coarser-grained (less accurate) matching process than may be supported by the code executed by the CPUs. The CPUs may verify that the code is detected, and may proceed to process the rest of the received audio samples to determine the command/request that was spoken after the key word/phrase. Even though the samples were received using the low power clock and the high performance clock, the detected samples may be treated as a continuous stream of samples for processing by the CPUs.

In another embodiment, the CPU complex 14 may not be awakened in parallel with the memory controller 22. For example, in some embodiments, the audio filter circuit 24 may be configured to perform the processing of the subsequent samples (but may power up the memory controller 22 to avail itself of the space in the memory 12 to store samples). In another embodiment, the audio filter circuit 24 may also be configured to perform other operations when the device 5 is idle, and the audio filter circuit 24 may use the memory 12 for storage for some of the operations. In such embodiments, the memory controller 22 may be powered up without powering up the CPU complex 14.

Powering up various components of the SOC 10 may include communication with the PMU 20. In an embodiment, the audio filter circuit 24 may be configured to communicate with the PMU 20 to cause the power up of the other SOC circuit sections. Alternatively, on chip power gating may be implemented to power up/power down various components of the SOC 10. The internal PMGR 28 may be configured to implement the on chip power gating and the audio filter circuit 24 may be configured to communicate with the PMGR 28 to cause the power up. In still other embodiments, a combination of the PMGR 28 and the PMU 20 may be used. In yet another embodiment, the PMGR 28 may be configured to communicate with the PMU 20 and audio filter circuit 24 may communicate power up requests to the PMGR 28, which may communicate with the PMU 20 as needed.

Between the sample buffer 30 and the memory 12, there may be little to no sample loss in the audio data from the microphone(s) 26A-26B. Accordingly, the user may speak the key word/phrase and continue without any required hesitation to speak the request/command.

In various embodiments, the audio filter circuit 24 may include any combination of fixed hardware and/or one or more processors that execute software. The software may be firmware included in the audio filter circuit 24 (e.g. stored in a non-volatile memory in the audio filter circuit 24). Alternatively, the firmware may be included in other non-volatile storage in the device 5 to be accessible for execution. If a fixed hardware implementation is used, the sample pattern may still be programmable as an input to the fixed hardware. Such programmability may allow different key words/phrases/sounds to be used, for multiple languages to be supported, etc. Implementing a fixed hardware audio filter circuit 24 may provide a more power-efficient solution to monitoring the audio samples than a processor executing software may provide.

It is noted that, while the description here may refer to a key word or phrase that may be used to activate the command mode, in general any sound may be used in various embodiments (e.g. a whistle, a hand clap, a non-verbal orally-generated sound, etc.).

As used herein, the term "power up" may refer to applying power to a circuit that is currently powered down (or powered off). In some embodiments, a given circuit may support more than one power state (e.g. voltage and frequency combinations). Powering up may refer to establishing any of the power states supported by the circuit. Powering up may also be referred to as powering on. The term "power down" or "power off" may refer to reducing the power supply voltage magnitude to zero volts (with respect to ground).

The audio codec 16 may be a general coder/decoder of audio data. The codec may include analog to digital converters configured to convert the signals received from the microphones 26A-26B into digital samples that may be transmitted to the SOC 10. The codec may include digital to analog converters configured to receive digital audio data from the SOC 10 and to convert the digital audio data to an analog signal to be played on the speakers. In an embodiment, the audio codec 16 may support one or more low power modes which may be used during times that the device 5 is idle. For example, the audio codec 16 may reduce the number of microphones that are open (or "on"), and may turn off the speakers. In some embodiments, the audio sample rate may be decreased in the low power mode.

The CPU complex 14 may include one or more processors that serve as the CPU of the SOC 10. The CPU of the system includes the processor(s) that execute the main control software of the system, such as an operating system. Generally, software executed by the CPU during use may control the other components of the device 5/SOC 10 to realize the desired functionality of the device 5. The CPU processors may also execute other software, such as application programs. The application programs may provide user functionality, and may rely on the operating system for lower level device control. Accordingly, the CPU processors may also be referred to as application processors. The CPU complex may further include other hardware such as a level 2 (L2) cache and/or an interface to the other components of the system (e.g. an interface to the communication fabric 27).

The peripherals 18A-18B may be any set of additional hardware functionality included in the SOC 10. More particularly, the peripheral 18A may be an interface unit configured to couple to the audio codec 16. Any interface may be used (e.g. the serial peripheral interface (SPI), serial or parallel ports, a proprietary interface for the audio codec 16, etc.). The peripheral 18B may include video peripherals such as video encoder/decoders, scalers, rotators, blenders, graphics processing units, display controllers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory requests from the other components of the SOC 10 and for accessing the memory 12 to complete the memory requests. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). In some embodiments, the memory 12 may be packaged separate from the SOC 10 (e.g. in a single inline memory module (SIMM), a dual inline memory module (DIMM) or one or more DRAM chips mounted to a circuit board to which the SOC 10 is mounted). In other embodiments, the memory 12 may be packaged with the SOC 10 (e.g. in a package-on-package or chip-on-chip configuration).

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

As mentioned above, the power manager 28 may manage internal power sequencing within the SOC 10. The power manager 28 may be configured to establish various power/performance states in various components within the SOC 10 to balance computational demands and power consumption in the device 5. The power manager 28 may be programmable with the desired power/performance states and may manage the power on/off and clock frequency setting of the various components based on the programmed states.

The PMU 20 may generally be responsible for supplying power to the components of the device 5, including the SOC 10, the audio codec 16, the peripherals 26A-26D, and the memory 12. The PMU 20 may be coupled to receive voltage magnitude requests from at least some of the components (e.g. the SOC 10) and may include voltage regulators configured to supply the requested voltages. The SOC 10 may receive multiple voltages (e.g. a CPU voltage for the CPU complex 14, a memory voltage for memory arrays in the SOC 10 such as caches, an SOC voltage or voltages for other components of the SOC, etc.).

The microphones 26A-26B may be any device capable of receiving sound and providing an output signal that represents the received sound. In some cases, more than one microphone may be desirable. For example, in a smart phone with video capability, it may be desirable to include a microphone near where the user's mouth would be when making a voice call, as well as one near the video camera for capturing sound from the subject being filmed. Any number of microphones may be included in various embodiments, and any number of the included microphones may be open when the device 5 is idle.

The speakers 26C-26D may be any device capable of receiving an input signal and generating sound represented by the signal. In some cases, more than one speaker may be desirable. For example, multiple speakers may permit stereo-type sound effects, and multiple speakers may permit sound production to be optimized based on the orientation of the device. Any number of speakers may be included in various embodiments.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1. Similarly, the type and number of components external to the SOC 10 but in the device 5 may be varied, and other components not shown in FIG. 1 may be included (e.g. a display to provide a visual interface to the user, which may be a touch display, networking components, antennas, radio frequency components such as wifi or cell phone components, etc.).

Figure 2:
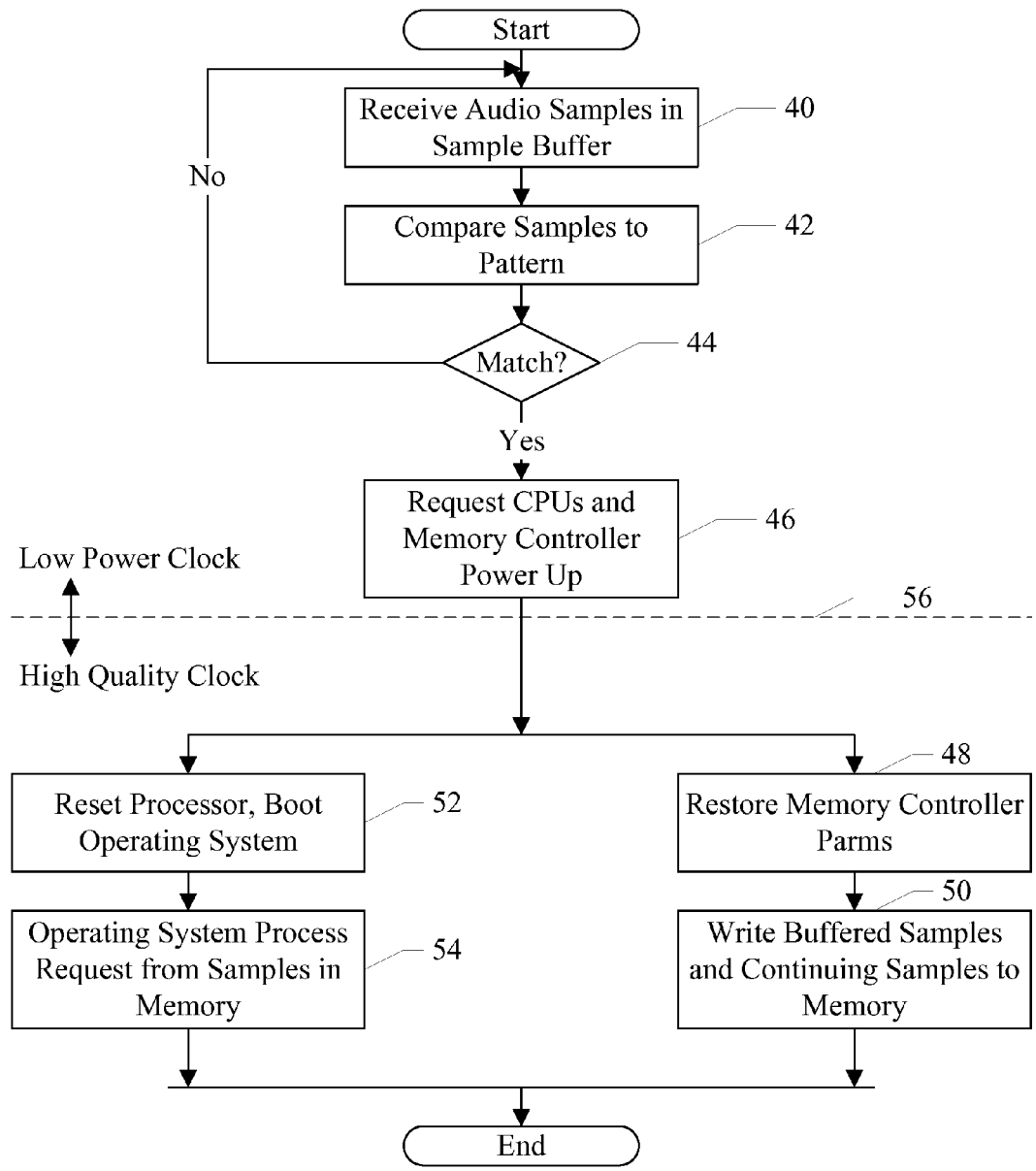
FIG. 2 is a flowchart illustrating operation of one embodiment of an audio filter circuit shown in FIG. 1.

Turning next to FIG. 2, a flowchart is shown illustrating operation of one embodiment of the audio filter circuit 24 and certain other parts of the device 5 during times that that the SOC 10 (or at least the CPU complex 14 and the memory controller 22) are powered down to conserve power (e.g. when the device 5 is idle). While the blocks are shown in a particular order for ease of understanding, other orders may be used. Blocks may be performed in parallel by combinatorial logic circuitry in the audio filter circuit 24 (including the blocks expressly shown in parallel in FIG. 2, and possibly other blocks). Blocks, combinations of blocks, and/or the flowchart as a whole may be pipelined over multiple clock cycles. Blocks may be implemented by a processor executing software in some embodiments, or the blocks may be fixed hardware, or any combination thereof. The audio filter circuit 24 may be configured to implement the operation shown in FIG. 2.

The audio filter circuit 24 may receive one or more audio samples from the audio codec 16 into the sample buffer 30 (block 40) and may compare the samples to the predetermined pattern that is used as the key word/phrase/sound to activate the voice command mode in the device 5 (block 42). If there is not a match (decision block 44, "no" leg), the audio filter circuit 24 may continue receiving samples into the sample buffer 30 and comparing the samples. The sample buffer 30 may overwrite the oldest samples with new samples once the sample buffer 30 is full. That is, a sample buffer 30 having N entries for samples (where N is a positive integer) may have the most recent N samples at any given point in time.

Responsive to detecting a match (decision block 44, "yes" leg), the audio filter circuit 24 may be configured to request that the CPU complex 14 and the memory controller 22 be powered up (block 46). The request may be transmitted to the PMU 20, the PMGR 28, or a combination of the two depending on the implementation. As mentioned previously, in other embodiments, only the memory controller 22 may be powered up. Alternatively, the memory controller 22 may be powered up first, and the CPU complex 14 may be powered up subsequently. Such a staggered power up may be used in cases in which powering up the memory controller 22 (and the fabric 27) in parallel with the CPU complex 14 may have the potential to exceed the allowable amount of current during the power up (the so-called "inrush current").

The memory controller 22 may be powered up, and the memory controller parameters 34B from the audio filter circuit 24 may be restored to the parameters 34A in the memory controller 22 (block 48). The parameters may be "restored" if the parameters 34B are a shadow of the most recent parameters 34A that were in use in the memory controller 22 (prior to powering down the memory controller 22). As mentioned above, in another embodiments, the parameters 34B may be a set of conservative "known good" parameters that will successfully permit access to the memory 12 but may not be optimized for maximum performance. In this case, "restoring" the parameters may refer to establishing the conservative parameters 34B as the parameters 34A. Subsequently, the memory controller 22 may be trained to the memory 12 and the parameters may be modified. The audio filter circuit 24 may write the matching samples and subsequent samples from the sample buffer 30 to the memory 12 through the memory controller 22, and may continue writing the samples until operation is terminated by the CPU complex 14, in an embodiment (block 50).

Additionally, the processors in the CPU complex 14 may boot into the operating system after being powered up and reset (block 52). The operating system, executing on the CPU complex 14, may process the samples stored in the memory 12 to verify that the key word/phrase/sound was indeed detected and to determine what the user's request is. The device 5 may attempt to perform the command/request (block 54).

Booting the operating system may include testing and programming the various components of the SOC 10, and may be a time-consuming task as compared to powering up and restoring the memory controller 22. The operating system may be designed to check if the reason for booting is due to detection of the key word/phrase/sound early in the process of booting, and may process at least the samples that represent the key word/phrase/sound to verify the detection. If the operating system determines that the detection by the audio filter circuit 24 was false, the operating system may cease the booting process and return the device 5 to an idle state (powering off the CPU complex 14 and the memory controller 22).

A portion of the flowchart may be performed by the audio filter circuit operating at the low power clock (above the horizontal dotted line 56 in FIG. 2) and the remaining portion (below the dotted line 56) may be performed at the high quality clock. The actual transition from the low power clock to the high quality clock may occur once the high quality clock becomes available (e.g. the PLL 38 has locked, the frequency is stable, etc.). Thus, the actual transition may occur in the midst of the processor resetting (block 52) and restoring the memory parameters (block 48), for example.

Figure 3:
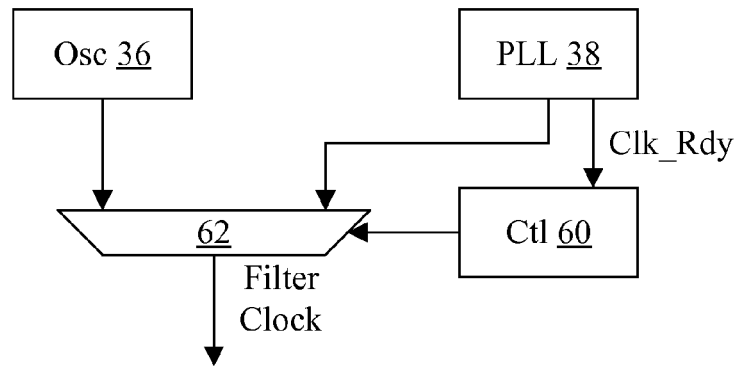
FIG. 3 is a block diagram illustrating clock selection for the audio filter circuit, according to one embodiment.

FIG. 3 is a block diagram illustrating the oscillator 36, the PLL 38, a mux 62, and a control circuit 60. The mux 62 is coupled to clock outputs of the PLL 38 and the oscillator 36, and has an output coupled to the filter clock (the clock for the filter circuit 24). The control circuit is coupled to the mux select control for the mux 62, and is coupled to a clock ready (Clk_Rdy) output from the PLL 38.

The control circuit 60 and the mux 62 may glitchlessly transition between the PLL clock and the oscillator clock, in either direction. In the case of the PLL clock becoming available again, the control circuit 60 may receive an assertion of the Clk_Rdy signal, indicating that the PLL has locked and the high quality clock output by the PLL 38 is stable. The control circuit 60 may be configured to ensure that both clocks are low, and then may be configured to switch the selection control from the oscillator 36 to the PLL 38. The next rising edge of the high quality clock may occur, and subsequently the filter clock may follow the high quality clock.

Figure 4:
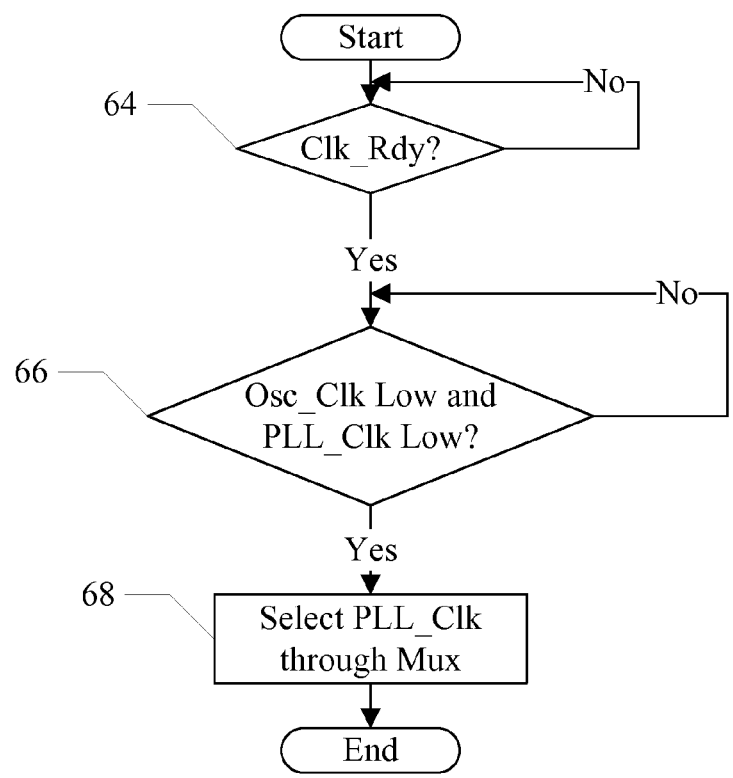
FIG. 4 is a flowchart illustrating operation of one embodiment of a control circuit shown in FIG. 3.

The above operation is illustrated in the flowchart of FIG. 4. While the blocks are shown in a particular order for ease of understanding, other orders may be used. Blocks may be performed in parallel by combinatorial logic circuitry in the control circuit 60. Blocks, combinations of blocks, and/or the flowchart as a whole may be pipelined over multiple clock cycles. The control circuit 60 may be configured to implement the operation shown in FIG. 4. If the clock ready assertion is received from the PLL 38 (decision block 64, "yes" leg) and both the oscillator clock from the oscillator circuit 36 and the PLL_clock from the PLL 38 are low (decision block 66, "yes" leg), the control circuit 60 may be configured to select the PLL_clock (the high quality clock) through the mux 62 (block 68).

Figure 5:
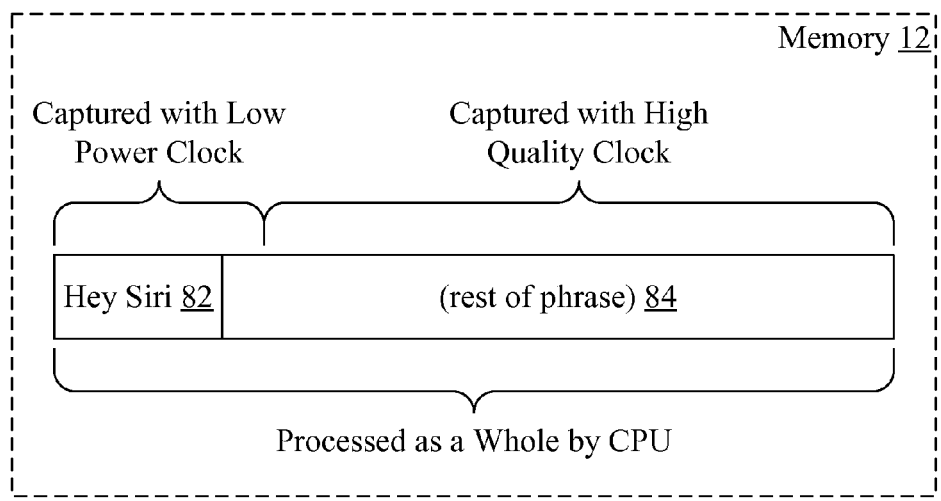
FIG. 5 is a block diagram of one embodiment of a phrase stored in the memory 12.

FIG. 5 is a block diagram illustrating the memory 12 after the audio samples captured by the audio filter circuit have been written to memory. As illustrated in FIG. 5, the samples include the samples 82 forming the "hey siri" key phrase (or purportedly the key phrase, if the verification has not been completed) as well as the samples 84 forming the rest of the phrase. As illustrated by the curly braces above the samples, the samples 82 and one or more of the initial samples 84 (captured before the high quality clock is available) may be captured with the low power clock, and the remaining samples 84 may be captured with the high quality clock. As illustrated by the curly brace below the samples 82 and 84, the CPUs may process the combination of the samples 82 and 84 as a whole (i.e. as a single continuous phrase), even though the samples are captured using different clocks.

Figure 6:
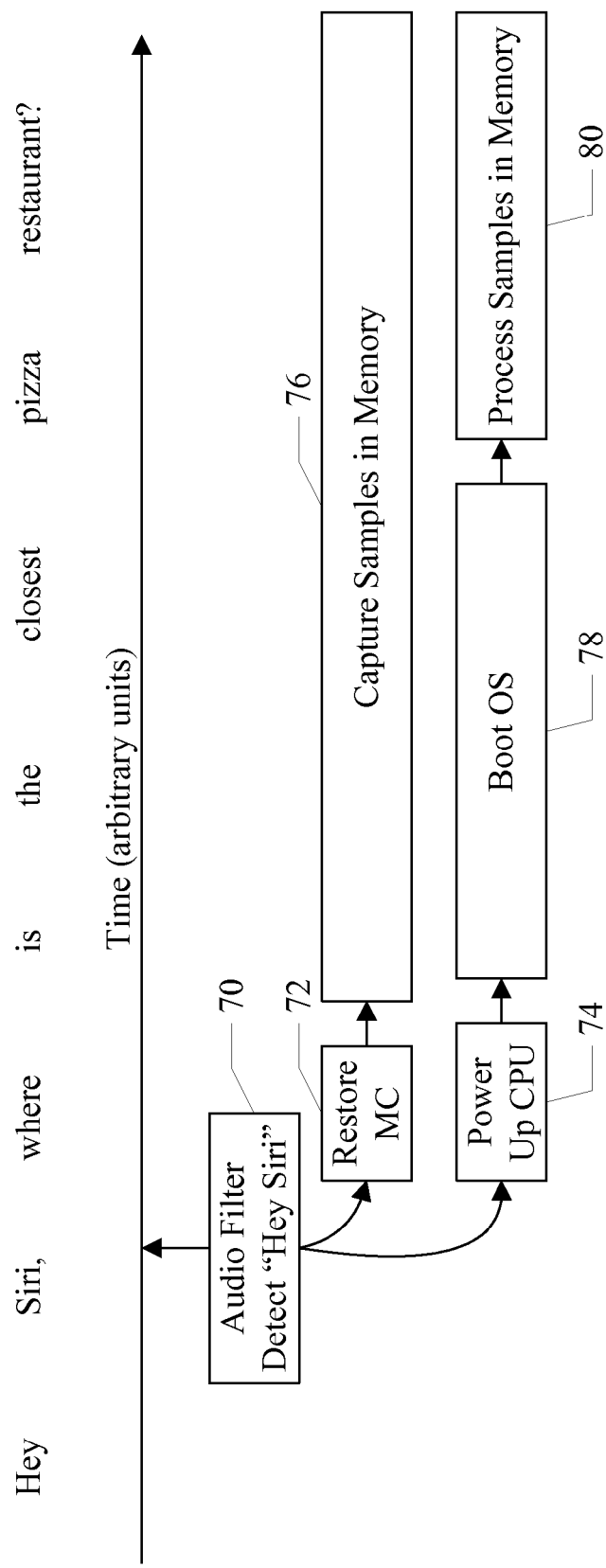
FIG. 6 is a timing diagram illustrating operation of one embodiment of the device shown in FIG. 1.

Turning now to FIG. 6, a timing diagram is shown illustrating operation of one embodiment of the device 5. Time increases from left to right in FIG. 6. At the beginning of the timing diagram, on the left, the device 5 may be idle and thus the audio filter circuit 24 may be monitoring the audio samples. Other portions of the SOC 10, such as the memory controller 22 and the CPU complex 14, may be powered down. The sentence across the top of the timing diagram may be uttered by the user, and in this example the key phrase may be "Hey Siri." However, any key word/phrase may be used in various embodiments.

As the audio samples generated in response to the microphone are processed by the audio filter circuit 24, the audio filter circuit 24 may detect the key phrase (reference numeral 70). Responsive to the detection, the audio filter circuit 24 may request power up of the memory controller 22 and the CPU complex 14 (reference numerals 72 and 74). The audio filter circuit 24 may restore the memory controller 22 from the parameters 34B, so that the memory controller 22 may become available to accept write operations. Subsequently, the audio filter circuit 24 may write the audio samples that matched the pattern, and the subsequent samples (representing "where is the closest pizza restaurant?"), to memory (reference numeral 76).

Meanwhile, the CPU may power up, reset, and boot the operating system (reference numerals 74 and 78). As illustrated in FIG. 6, the booting of the operating system, to the point at which the audio sample processing may begin (reference numeral 80), may take longer than the restoration of the memory controller 22. The samples that are received and captured by the memory controller, e.g. the word or words immediately following the key word, would not be captured if only the operating system were capturing the words after boot. Thus, continuous speaking by the user may be captured and a more natural (to the user) interface may be available. As mentioned previously, in some embodiments, the CPU may not power up in parallel with the memory controller 22.

Numerous variations and modifications will become apparent to those skilled in the art once the above disclosure is fully appreciated. It is intended that the following claims be interpreted to embrace all such variations and modifications.

What is claimed is:

1. A method comprising:
monitoring audio samples in a first component in an integrated circuit during a time that a remainder of the integrated circuit is powered down, wherein the first component is powered on during the time and is operating according to a first clock;
detecting a key phrase in the audio samples by the first component;
powering up at least a portion of the integrated circuit responsive to the detecting;
determining that a second clock used within the integrated circuit is available, wherein the second clock has at least one characteristic that is closer to an ideal clock characteristic than a corresponding characteristic of the first clock, wherein the second clock becomes available responsive to powering up the portion of the integrated circuit, and wherein the at least one characteristic comprises a duty cycle, and wherein the second clock has a duty cycle that is closer to a 50% duty cycle than a duty cycle of the first clock; and
switching to the second clock in the first component at a time that is prior to an arrival of subsequent audio samples to ensure that no more than a threshold number of audio samples is lost or corrupted during the switching.

2. The method as recited in claim 1 wherein the one or more characteristics include phase noise.

3. The method as recited in claim 1 wherein the one or more characteristics include frequency accuracy.

4. The method as recited in claim 1 wherein the one or more characteristics include period jitter.

5. The method as recited in claim 1 further comprising:
capturing a first plurality of the audio samples by the first component operating according to the first clock;
capturing a second plurality of samples by the first component operating according to the second clock;
writing the first plurality of samples and the second plurality of samples to a memory to which the integrated circuit is coupled; and
processing the first plurality of samples and the second plurality of samples from the memory as a single phrase.

6. The method as recited in claim 5 wherein the processing is performed by a processor that is part of the portion of the integrated circuit that is powered up responsive to detecting the key phrase.

7. The method as recited in claim 6 wherein the powering up comprises booting an operating system on the processor.

8. The method as recited in claim 1 further comprising generating the first clock in an oscillator in the integrated circuit.

9. The method as recited in claim 8 further comprising generating the second clock in a phase lock loop (PLL) in the integrated circuit.

10. An integrated circuit comprising:
one or more processors; and
a first circuit coupled to the one or more processors, wherein the first circuit is configured to:
remain powered up during times that the one or more processors are powered down;
receive a first plurality of audio samples captured by one or more audio input devices during a time that the one or more processors are powered down, wherein the first circuit operates according to a first clock during the time that the one or more processors are powered down;
detect a predetermined pattern in the first plurality of audio samples;
cause the one or more processors to power up responsive to detecting the predetermined pattern, wherein a second clock activates responsive to the power up; and
switch to the second clock responsive to the second clock becoming operable at a time that is prior to an arrival of a subsequent second plurality of audio samples, wherein the second clock has a duty cycle that is closer to a 50% duty cycle than a duty cycle of the first clock.

11. The integrated circuit as recited in claim 10 wherein the predetermined pattern represents sound comprising a verbal utterance of one or more words.

12. The integrated circuit as recited in claim 10 further comprising a memory controller coupled to the first circuit, wherein the first circuit is configured to provide one or more memory controller parameters to the memory controller to program the memory controller for operation responsive to the power up.

13. The integrated circuit as recited in claim 10 wherein the first circuit comprises a buffer configured to store the first plurality of the audio samples and a second plurality of audio samples received during and after the power up, wherein the first circuit is configured to write the first plurality of samples and the second plurality of samples to the memory.

14. The integrated circuit as recited in claim 10 wherein the second clock has a lower phase noise than the first clock during use.

15. The integrated circuit as recited in claim 10 wherein a period jitter of the second clock is lower than the period jitter of the first clock.

16. The integrated circuit as recited in claim 10 wherein a frequency accuracy of the second clock is higher than the frequency accuracy of the first clock.

17. A system comprising:
an audio input device;
an audio coder/decoder (codec) coupled to the audio input device and configured to generate audio samples from sound detected by the audio input device;
a memory; and
an integrated circuit coupled to the audio codec and the memory, wherein the integrated circuit includes an audio filter circuit, one or more processors, and a memory controller coupled to the memory, and wherein:
the audio filter circuit is configured to detect a predetermined pattern in the audio samples from the audio codec during a time that a memory controller and the one or more processors are powered down, wherein the audio filter circuit operates according to a first clock during the time;
the audio filter circuit is configured to cause the memory controller and the processors to power up responsive to detecting the predetermined pattern, wherein the power up causes a second clock to activate in the integrated circuit; and
the audio filter circuit configured to switch from the first clock to the second clock responsive to activation of the second clock at a time that is prior to an arrival of a subsequent audio sample, wherein the second clock has a duty cycle that is closer to a 50% duty cycle than a duty cycle of the first clock.

18. The system as recited in claim 17 wherein the integrated circuit includes an on-chip oscillator that sources the first clock and a phase-lock loop that sources the second clock.

* * * * *